United States Patent
Owen et al.

(10) Patent No.: US 8,781,703 B2
(45) Date of Patent: Jul. 15, 2014

(54) SELECTIVE AUTOMATED VEHICLE BRAKE FORCE RELEASE ON AN INCLINED SURFACE

(71) Applicant: Jaguar Cars Limited, Coventry (GB)

(72) Inventors: Simon Owen, Coventry (GB); Karl Richards, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 13/627,426

(22) Filed: Sep. 26, 2012

(65) Prior Publication Data

US 2014/0088848 A1     Mar. 27, 2014

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60T 8/24 | (2006.01) |
| B60T 8/17 | (2006.01) |
| B60T 8/32 | (2006.01) |

(52) U.S. Cl.
CPC ... *B60T 8/17* (2013.01); *B60T 8/24* (2013.01); *B60T 2250/00* (2013.01); *B60T 8/32* (2013.01)
USPC ............... 701/70; 701/78; 701/79; 701/83

(58) Field of Classification Search
CPC ............... B60T 8/17; B60T 8/24; B60T 8/32; B60T 2250/00
USPC ........................................ 701/70, 78, 79, 83
See application file for complete search history.

(56) References Cited

U.S. PATENT DOCUMENTS

| | | | |
|---|---|---|---|
| 7,762,633 B2 * | 7/2010 | Maskell et al. ............... 303/192 |
| 8,123,659 B2 * | 2/2012 | Leibbrandt et al. ........... 477/175 |
| 2010/0292902 A1 * | 11/2010 | Bach et al. ...................... 701/70 |
| 2012/0209490 A1 * | 8/2012 | Lu et al. .......................... 701/78 |
| 2013/0226424 A1 * | 8/2013 | Knechtges et al. ............. 701/70 |

* cited by examiner

*Primary Examiner* — Calvin Cheung
*Assistant Examiner* — Paula L Schneider
(74) *Attorney, Agent, or Firm* — Carlson, Gaskey & Olds

(57) ABSTRACT

An system for controlling vehicle movement includes a brake assembly configured to selectively resist movement of the vehicle. A controller selectively controls a brake force applied by the brake assembly. The controller is configured to determine a drive torque condition when the vehicle is stationary on an inclined surface. The controller selectively controls a rate of automatically reducing the brake force dependent on the determined drive torque condition to allow the vehicle to accelerate.

21 Claims, 2 Drawing Sheets

SELECTIVE AUTOMATED VEHICLE BRAKE FORCE RELEASE ON AN INCLINED SURFACE

TECHNICAL FIELD

The subject matter of this description generally relates to controlling vehicle movement. More particularly, but not exclusively, the subject matter of this description relates to automated brake control for controlling vehicle movement along an inclined surface. Aspects of the invention relate to a system, to a method and to a vehicle.

BACKGROUND

Modern automobiles have a variety of automated control systems, such as vehicle brake control. Anti-lock brake systems are well-known examples of automated vehicle brake control. A controller may determine when any one or more of the vehicle wheels is rotating at a rate that indicates the wheel is slipping and responsively controls the brake force to reduce such slipping. Anti-lock or similar brake control strategies have been incorporated into various automated vehicle stability control systems.

Some vehicles are designed to be capable of driving over various terrains. Such all-terrain vehicles may be driven over rough or very steeply inclined surfaces, for example. One automated control strategy provided on some such vehicles is known as hill descent control (HDC). With some HDC systems, a driver is able to select a desired speed for descending a hill. The automated HDC typically includes controlling the brakes to attempt to maintain the vehicle speed at or below the desired speed indicated by the driver.

One improvement to HDC is disclosed in U.S. Pat. No. 7,762,633. That patent describes an approach to controlling the vehicle brakes to attempt to allow the vehicle to accelerate from a standstill to a desired hill descent speed in a controlled manner depending on the slope of the hill. Such brake control is intended to avoid driver discomfort or lack of confidence in the HDC feature, either of which may be associated with an unexpectedly rapid or uneven acceleration of the vehicle.

SUMMARY

According to one aspect of the invention there is provided a system for controlling vehicle movement including a brake assembly configured to selectively resist movement of the vehicle. A controller selectively controls a brake force provided by the brake assembly. The controller may be configured to determine a drive torque condition when the vehicle is stationary on an inclined surface. The controller may selectively control a rate of automatically reducing the brake force dependent on the determined drive torque condition to allow the vehicle to accelerate.

According to another aspect of the invention there is provided a method of controlling movement of a vehicle, which has a brake assembly configured to selectively resist movement of the vehicle and a controller that selectively controls a brake force provided by the brake assembly, including determining a drive torque condition when the vehicle is stationary on an inclined surface. A rate of automatically releasing the brake force may be selectively controlled dependent on the determined drive torque condition to allow the vehicle to accelerate.

Within the scope of this document it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
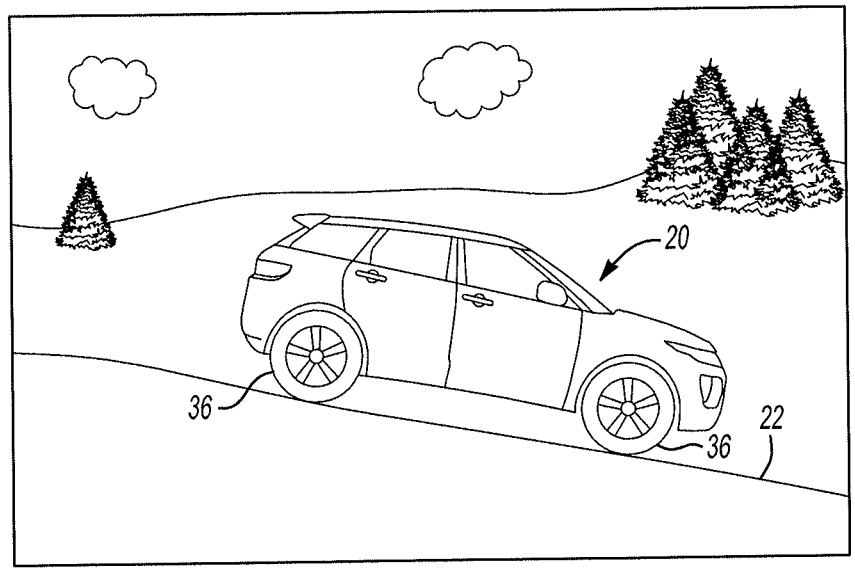
FIG. 1 diagrammatically illustrates a vehicle that includes a system for controlling movement of the vehicle that is designed according to an embodiment of this invention.
Figure 2:
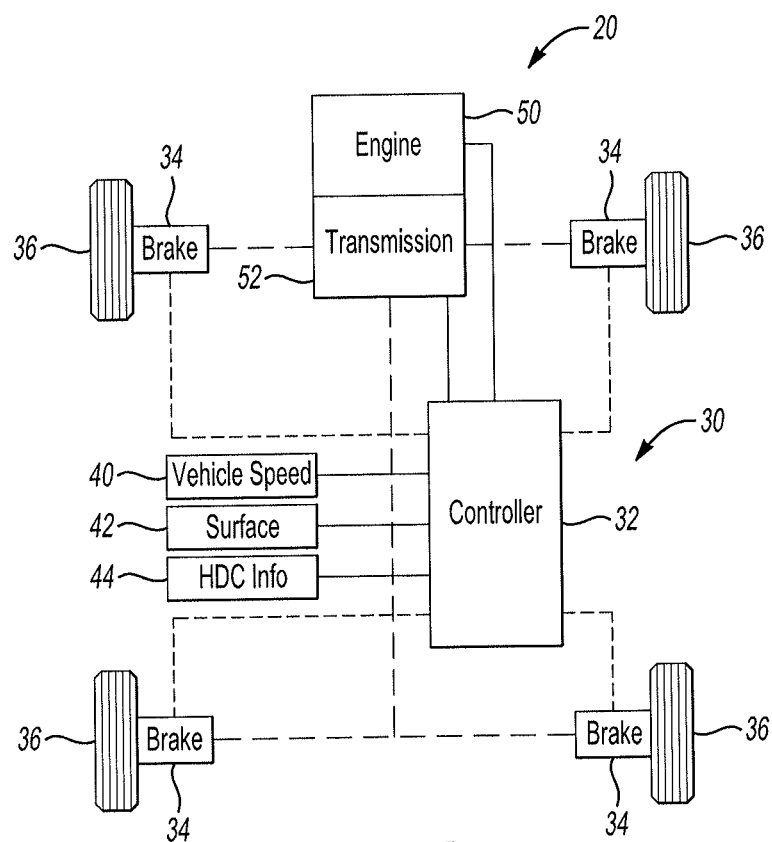
FIG. 2 schematically illustrates an example system for controlling vehicle movement designed according to an embodiment of this invention.

FIG. 1 shows a vehicle 20 on an inclined surface 22. The vehicle includes a system 30 as schematically shown in FIG. 2 for controlling movement of the vehicle along the inclined surface 22.

The system 30 includes a controller 32 that is configured to automatically control a braking force applied to a vehicle wheel 36 by an associated brake assembly 34. In the illustrated example, brake components are associated with each of four wheels 36 of the vehicle 20. The controller 32 controls the brake force applied by the brake assembly 34 for maintaining control over a speed of movement of the vehicle 20 along the inclined surface 22.

In the example shown, the vehicle 20 utilizes a hydraulic brake system of a known type. In this system, brake force applied to the wheels 36 is proportional to hydraulic brake pressure in the brake system. It will be appreciated that a controlled reduction in brake force may be achieved by a corresponding controlled release in brake pressure in such a hydraulic brake system. This pressure may be a result of manual operation by the vehicle driver of a foot operated brake pedal, or may be as a result of intervention by one or more automated braking control systems such as anti-lock brakes, traction control systems and/or a hill descent aid for example. It will be appreciated by one skilled in the art that hydraulically operated friction brakes are commonly used in motor vehicles, but that other systems for controlling the movement of a vehicle are also relevant, such systems include air operated brakes, which control air pressure in a pressurized circuit to vary brake force, and electromagnetic brakes, where a brake force is applied to a wheel 36 by means of an electric motor, generator, or eddy current device.

The controller 32 in some examples uses one of several known hill descent control techniques for maintaining vehicle speed at or near a desired hill descent speed selected by a driver of the vehicle 20, for example. The controller 32 is configured to provide selective control over a rate of reducing the brake force in a manner that is intended to enhance the experience of a driver and any passengers in the vehicle 20 as the vehicle accelerates from a standstill on the inclined surface 22.

The controller 32 utilizes information from one or more sources for determining how to selectively control the rate of reducing the brake force provided by the brake assembly 34. In the illustrated example, the controller 32 obtains vehicle speed information from a source schematically shown at 40. The source 40 of the vehicle speed information in some examples comprises a sensor, such as an accelerometer, supported on the vehicle 20. Other devices capable of providing an indication of vehicle speed, such as a global positioning system or speedometer, may be used as alternative or additional sources of vehicle speed information. The vehicle speed information at least provides an indication to the controller 32 whether the vehicle 20 is currently moving or stationary.

The controller 32 also obtains surface information from a source schematically shown at 42. In one example, source 42 comprises an inclinometer that provides an indication of a slope or grade of the inclined surface 22 upon which the vehicle 20 is situated. The grade of the surface 22 has an effect on the tendency of the vehicle to accelerate based on the mass of the vehicle, for example.

Some example sources 42 of surface information also provide the controller 32 with an indication of a condition of the inclined surface, such as an indication of a very rough or wet surface condition. Known sensors and techniques are used in some examples for providing such surface condition information to the controller 32. Other examples include a driver interface (e.g., a switch or selector) that allows the driver to provide an indication of the surface conditions. For example, the driver may be able to select a surface description from among several options, such as grass, gravel, mud or snow. The surface condition may be taken into account when determining a desired brake control strategy as the vehicle response may vary depending on the surface conditions.

The illustrated example also includes a source 44 of hill descent control (HDC) information. The controller 32 utilizes information regarding a driver's desire to utilize HDC for purposes of determining whether and how to control the brake assembly 34. In some examples, known HDC control techniques are used by the controller 32 for maintaining the speed of the vehicle 20 at or below a selected maximum speed during HDC. As various HDC techniques are known to those skilled in the art, no further explanation of how the general manner of HDC could be accomplished by the system 30 need be provided in this description.

One way in which the system 30 differs from known systems capable of HDC is that the controller 32 is configured to selectively control a rate of automatically reducing brake force provided by the brake assembly 34 during acceleration of the vehicle 20 from a standstill on an inclined surface. The controller 32 obtains information regarding a vehicle engine 50 and information regarding a transmission 52 associated with the engine 50 for purposes of determining how to selectively control the rate of reducing the brake force provided by the brake assembly 34, for example by a controlled reduction or release of brake pressure.

The selective control over brake force provided by the controller 32 compensates for variations in vehicle movement that may occur because of current conditions. The controller 32 utilizes information regarding a current drive torque condition for purposes of determining how to control the release of brake force. The drive torque applied to the wheels 36 by the engine 50 and transmission 52 can have a significant effect on how the vehicle 20 accelerates as it begins to move along an inclined surface after being stationary. The controller 32 is configured to compensate for differences associated with different drive torque conditions for providing a more consistent vehicle movement profile, which can enhance the driver's experience of using an automated HDC feature of a vehicle.

Figure 3:
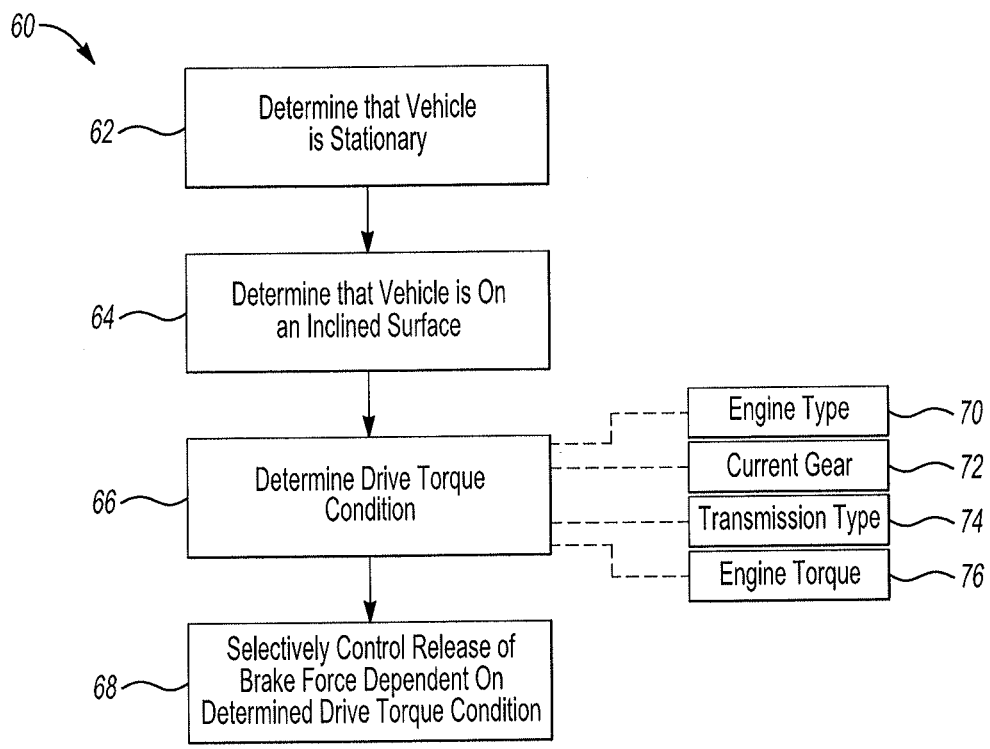
FIG. 3 is a flowchart diagram summarizing an example approach for controlling vehicle movement according to an embodiment of this invention.

FIG. 3 includes a flow chart 60 that summarizes an example approach. At 62 the controller 32 determines that the vehicle 20 is stationary. The source 40 of vehicle speed information provides an indication to the controller 32 whether the vehicle 20 is stationary. At 64 the controller 32 determines that the vehicle 20 is on an inclined surface. The grade or slope of the inclined surface is also determined as that has an effect on the vehicle acceleration from standstill and the brake force reduction profile selected by the controller compensates for different effects associated with different grades.

In some examples, the determination at 64 includes determining a slope or grade of the incline for purposes of determining whether the brake force reduction control available through the controller 32 should be used. For example, some systems 30 will be configured to use selective brake force reduction control only if the slope is significant enough that the incline and the current drive torque condition will have a noticeable effect on the vehicle movement during acceleration from standstill. Given this description, those skilled in the art will be able to determine an appropriate slope or grade threshold if one is desirable for their particular implementation.

At 66 the controller 32 determines the drive torque condition. At 68 the controller 32 selectively controls the reduction of brake force dependent on the determined drive torque condition. The controller 32 uses at least information regarding the engine 50 and the transmission 52 for determining the current drive torque condition.

In the example of FIG. 3, the controller 32 uses information schematically shown at 70 regarding the type of engine 50 that has been provided on the vehicle 20. In one example, the controller 32 obtains information regarding the engine type from another device on the vehicle 20 that indicates the type of engine 50 on the vehicle 20. The controller 32 in some examples is configured with different control algorithms or patterns for several engine types and uses those corresponding to the type of the engine 50. In some examples, the controller 32 may be informed of the engine type each time that the vehicle ignition is turned on while in others the controller 32 is informed of the engine type once before the vehicle 20 is shipped from a manufacturing facility and the vehicle information is hard coded into the controller 32.

Different engine types will have different effects on the drive torque that exists when the vehicle 20 begins to accelerate from a stationary position on an inclined surface. The controller 32 takes the engine type into account when selecting how to control the rate of reducing the brake force. For example, a gasoline engine typically has a different torque at idle compared to a diesel engine. The effects of such torque differences are incorporated into the programming of the controller 32 so that the brake force control selected by the controller 32 compensates for differences in vehicle movement that would result from the torque differences.

As schematically shown at 72, the controller 32 also utilizes information regarding a current gear of the transmission 52 for purposes of determining the current drive torque condition. Different gears deliver different amounts of torque to the wheels 36. For example, there typically is a different amount of torque associated with a forward gear compared to a reverse gear. The torque associated with the current transmission gear may impact how the vehicle 20 accelerates. The controller 32 includes programming designed to compensate for different vehicle motion profiles that would result from different transmission gears.

In some examples, the current gear information is provided to the controller 32 by another device, such as a transmission controller. In some examples, the controller 32 is programmed to make such a determination on its own based on appropriate sensor information.

In the example of FIG. 3, the controller 32 also takes the type of transmission into account as schematically shown at 74. A manual transmission will not have the same drive torque effects as an automatic transmission. An automatic transmission typically has significantly more torque at idle compared to the normally non-existent torque associated with a manual transmission at idle (i.e., the clutch is 'open' or disengaged, so that no torque is transmitted from the engine). Additional variations in transmission configurations may also be taken into account.

Other variations in transmission configuration may include vehicles provided with a transfer case to vary the effective combined drive ratio of the transmission. Vehicles fitted with a transfer case in addition to a manual or automatic transmission may typically be operated in a 'HIGH' ratio, suited to highway driving, and a 'LOW' ratio more suited to driving off-road. Typically any gear that may be selected either manually or automatically from the transmission in 'HIGH' may also be available for use when the transfer case is set to 'LOW' ratio, but obviously the combined drive ratio from the engine to the wheels is lower. This change in ratio may impact the drive torque condition. The example controller 32 is programmed in a manner that allows the controller to select an appropriate brake force release rate depending on one or more characteristics associated with the transmission type.

The example of FIG. 3 also includes information regarding engine torque schematically shown at 76. The engine torque may vary at different times and the controller 32 obtains information regarding the current engine torque as another input parameter for purposes of selecting an appropriate brake force release rate profile.

In some examples, the drive torque condition is determined by the controller 32 based on sensor information that provides an indication of the torque of interest. For example, some embodiments of the controller 32 are programmed to use information from a sensor capable of providing an indication of engine torque or torque associated with the output of the transmission 50 for purposes of determining the current drive torque condition. Some such examples may not require that the controller 32 is provided with data pertaining to the type of engine or the gear of the transmission as discrete parameters. Instead, in some examples, it is possible for the controller 32 to determine torque information, which is dependent on the type of engine and the selected gear, without the controller 32 having information that specifically identifies the engine type or the current gear. In other words, the controller 32 may use information regarding the drive torque condition that corresponds to the engine type and current gear without having to identify the engine type as an engine type per se and without having to identify the current gear by gear ratio or number.

Although various input parameters, which are useful to the controller 32, are described above, those skilled in the art will realize that additional information or parameters may be useful for selecting how to control the brake assembly 34. Additionally, not every embodiment of the system 30 will utilize all of the described information. Those skilled in the art who have the benefit of this description will be able to select the input parameters that will provide sufficient drive torque information to allow their particular controller to perform to meet their particular needs.

Figure 4:
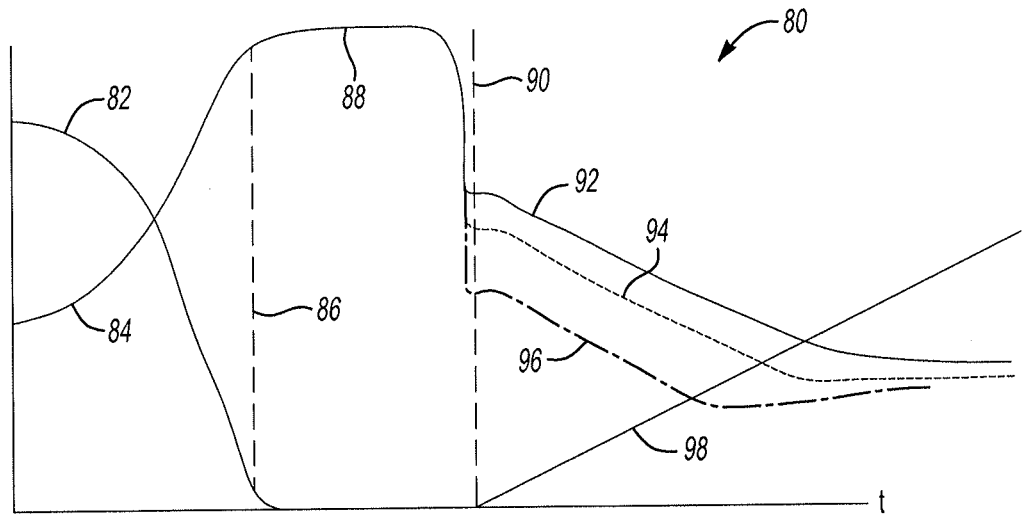
FIG. 4 is a graphical representation of an example approach for controlling vehicle movement according to an embodiment of this invention.

FIG. 4 graphically illustrates performance of the controller 32 and the brake assembly 34 under example conditions. A plot 80 includes a first curve portion 82 that represents the speed of the vehicle 20. A second curve portion 84 represents brake force while a driver is applying the brakes. At a time shown at 86, the vehicle 20 has reached a standstill on an inclined surface. The brake force is shown at a third curve portion 88 while the vehicle 20 is stationary.

At a time 90, the driver intends for the vehicle 20 to begin moving, which may be indicated by the driver releasing the brake pedal or providing an input through a HDC driver interface. The controller 32 uses information regarding or corresponding to at least the engine type and the current gear of the transmission 52 for purposes of determining the current drive torque condition. The controller 32 selectively controls the brake force release profile depending on the determined drive torque.

A first brake force release rate is shown at 92. A second brake force release rate is shown at 94. The controller will select the first rate 92 under some conditions and the second rate 94 under other conditions. The example of FIG. 4 includes a third brake force release rate shown at 96, which will be useful for still other conditions. The controller uses the determined drive torque condition for selecting which of the profiles 92, 94 or 96 to utilize in a particular instance. For example, the first rate 92 may be useful if the transmission 50 is in reverse gear and the second rate 94 may be useful for a situation when the transmission 50 is in drive.

In this example, regardless of which brake force release rate the controller 32 selects, the vehicle accelerates approximately the same as shown by the fourth curve portion 98, which represents vehicle speed. In this example, the system 30 provides an approximately consistent experience for the driver based on approximately consistent vehicle acceleration from standstill even under different drive torque conditions.

In one example implementation, the brake force release profiles 92, 94 and 96 are predetermined and programmed into the controller 32 or provided in a memory that is accessible by the controller 32. In such an example, the controller 32 determines the drive torque condition (and other parameters, such as slope) and selects an appropriate profile. In another example implementation, the controller 32 determines the brake force release profile depending on the current conditions. The controller 32 in some examples dynamically adjusts the manner in which the brake force is released responsive to information regarding the vehicle response.

FIG. 4 can also be considered for demonstrating how different engine types and transmission types have an effect on the desired brake force release rate profile. For example, at a given inclined surface slope, the first rate 92 may be useful for a diesel engine 50 associated with an automatic transmission 52, the second rate 94 may be useful for a gasoline engine 50 associated with an automatic transmission 52 and the third rate 96 may be useful for a diesel engine 50 associated with a manual transmission 52.

Selectively controlling the rate at which the brake is released when a vehicle accelerates from standstill on an inclined surface as described above provides a more predictable and consistent vehicle motion profile and associated driver experience. The disclosed system and technique contributes to avoiding situations where a driver becomes uncomfortable or unconfident in an automated HDC feature on a vehicle. Different inclined surface conditions, such as grade, and different drive torque conditions, which are associated with the type of engine and current transmission gear, have less of a perceived impact on vehicle motion when the disclosed technique is utilized. Additionally, HDC is enhanced because the selectively controlled brake force release rate contributes to avoiding over acceleration that would otherwise occur under some conditions, which may require an automated brake application during HDC.

Non-limiting aspects of one or more embodiments of the invention will also be understood with reference to the following numbered paragraphs:

1. A system for controlling vehicle movement, comprising:
   a brake assembly configured to selectively resist movement of a vehicle;
   a controller that selectively controls a brake force applied by the brake assembly, the controller being configured to determine a drive torque condition when the vehicle is stationary on an inclined surface; and
   selectively control a rate of automatically reducing the brake force dependent on the determined drive torque condition to allow the vehicle to accelerate.

2. The system of paragraph 1, wherein the controller is configured to determine the drive torque condition based on information corresponding to a type of engine associated with the vehicle.

3. The system of paragraph 1 or paragraph 2, wherein the controller is configured to determine the drive torque condition based on information corresponding to a current gear of a transmission associated with an engine of the vehicle.

4. The system of any preceding paragraph, wherein the controller is configured to determine the drive torque condition based on at least one characteristic of a transmission of the vehicle, the at least one characteristic being dependent on a type of the transmission.

5. The system of any preceding paragraph, wherein the controller is configured to determine the drive torque condition based on information corresponding to a current engine torque of an engine of the vehicle.

6. The system of any preceding paragraph, wherein the controller is configured to determine a slope of the inclined surface; and selectively control the rate of automatically reducing the brake force dependent on the slope.

7. The system of any preceding paragraph, wherein the controller is configured to determine a terrain condition of the inclined surface; and selectively control the rate of automatically reducing the brake force dependent on the terrain condition.

8. The system of any preceding paragraph, wherein the controller is configured to use a first rate of automatically reducing the brake force for a first determined drive torque condition; and use a second, different rate of automatically reducing the brake force for a second, different determined drive torque condition.

9. The system of paragraph 8, wherein the controller is configured to achieve a first vehicle acceleration rate using the first rate of automatically reducing the brake force for a determined slope of the inclined surface; achieve a second vehicle acceleration rate using the second rate of automatically reducing the brake force for the determined slope of the inclined surface; and wherein the first vehicle acceleration rate is approximately equal to the second vehicle acceleration rate.

10. The system of paragraph 1, wherein the controller is configured to determine a target vehicle descent speed; and selectively control the rate of automatically reducing the brake force dependent on the target vehicle descent speed.

11. A method of controlling movement of a vehicle including a brake assembly configured to selectively resist movement of the vehicle and a controller that selectively controls a brake force applied by the brake assembly, the method comprising the steps of determining a drive torque condition when the vehicle is stationary on an inclined surface; and selectively controlling a rate of automatically reducing the brake force dependent on the determined drive torque condition to allow the vehicle to accelerate.

12. The method of paragraph 11, comprising determining the drive torque condition based on information corresponding to a type of engine associated with the vehicle.

13. The method of paragraph 11 or paragraph 12, comprising determining the drive torque condition based on information corresponding to a current gear of a transmission associated with an engine of the vehicle.

14. The method of any of paragraphs 11 to 13, comprising determining the drive torque condition based on at least one characteristic of a transmission, the at least one characteristic being dependent on a type of the transmission.

15. The method of any of paragraphs 11 to 14, comprising determining the drive torque condition based on information corresponding to a current engine torque of an engine of the vehicle.

16. The method of any of paragraphs 11 to 15, comprising determining a slope of the inclined surface; and selectively controlling the rate of automatically reducing the brake force dependent on the slope.

17. The method of any of paragraphs 11 to 16, comprising determining a terrain condition of the inclined surface; and selectively controlling the rate of automatically reducing the brake force dependent on the terrain condition.

18. The method of any of paragraphs 11 to 17, comprising using a first rate of automatically reducing the brake force for a first determined drive torque condition; and using a second, different rate of automatically reducing the brake force for a second, different determined drive torque condition.

19. The method of any of paragraphs 11 to 18, comprising achieving a first vehicle acceleration rate using the first rate of automatically reducing the brake force for a determined slope of the inclined surface; achieving a second vehicle acceleration rate using the second rate of automatically reducing the brake force for the determined slope of the inclined surface; and wherein the first vehicle acceleration rate is approximately equal to the second vehicle acceleration rate.

20. The method of any of paragraphs 11 to 19, comprising determining a target vehicle descent speed; and selectively controlling the rate of automatically reducing the brake force dependent on the target vehicle descent speed.

21. A vehicle having a system as set out in any of paragraphs 1 to 10 or adapted to use a method as set out in any of paragraphs 11 to 20.

The preceding description explains at least one example embodiment and is not intended to be limiting in nature. Variations and modifications to the disclosed examples may become apparent to those skilled in the art that do not necessarily depart from the essence of this invention. The scope of legal protection given to this invention can only be determined by studying the following claims.

We claim:

1. A system for controlling vehicle movement, comprising:
   a brake assembly configured to selectively resist movement of a vehicle;
   a controller that selectively controls a brake force applied by the brake assembly, the controller being configured to determine a drive torque condition when the vehicle is stationary on an inclined surface; and
   selectively control a rate of automatically reducing the brake force dependent on the determined drive torque condition to allow the vehicle to accelerate.

2. The system of claim 1, wherein the controller is configured to determine the drive torque condition based on information corresponding to a type of engine associated with the vehicle.

3. The system of claim 2, wherein the controller is configured to determine the drive torque condition based on information corresponding to a current gear of a transmission associated with the engine.

4. The system of claim 3, wherein the controller is configured to determine the drive torque condition based on at least one characteristic of the transmission, the at least one characteristic being dependent on a type of the transmission.

5. The system of claim 3, wherein the controller is configured to determine the drive torque condition based on information corresponding to a current engine torque of the engine.

6. The system of claim 3, wherein the controller is configured to determine a slope of the inclined surface; and selectively control the rate of automatically reducing the brake force dependent on the slope.

7. The system of claim 6, wherein the controller is configured to determine a terrain condition of the inclined surface; and selectively control the rate of automatically reducing the brake force dependent on the terrain condition.

8. The system of claim 1, wherein the controller is configured to use a first rate of automatically reducing the brake force for a first determined drive torque condition; and use a second, different rate of automatically reducing the brake force for a second, different determined drive torque condition.

9. The system of claim 8, wherein the controller is configured to achieve a first vehicle acceleration rate using the first rate of automatically reducing the brake force for a determined slope of the inclined surface;

achieve a second vehicle acceleration rate using the second rate of automatically reducing the brake force for the determined slope of the inclined surface; and wherein the first vehicle acceleration rate is approximately equal to the second vehicle acceleration rate.

10. The system of claim 1, wherein the controller is configured to determine a target vehicle descent speed; and selectively control the rate of automatically reducing the brake force dependent on the target vehicle descent speed.

11. A method of controlling movement of a vehicle including a brake assembly configured to selectively resist movement of the vehicle and a controller that selectively controls a brake force applied by the brake assembly, the method comprising the steps of:

using the controller for determining a drive torque condition when the vehicle is stationary on an inclined surface; and using the controller for selectively controlling a rate of automatically reducing the brake force dependent on the determined drive torque condition to allow the vehicle to accelerate.

12. The method of claim 11, comprising determining the drive torque condition based on information corresponding to a type of engine associated with the vehicle.

13. The method of claim 12, comprising determining the drive torque condition based on information corresponding to a current gear of a transmission associated with the engine.

14. The method of claim 13, comprising determining the drive torque condition based on at least one characteristic of the transmission, the at least one characteristic being dependent on a type of the transmission.

15. The method of claim 13, comprising determining the drive torque condition based on information corresponding to a current engine torque of the engine.

16. The method of claim 13, comprising determining a slope of the inclined surface; and selectively controlling the rate of automatically reducing the brake force dependent on the slope.

17. The method of claim 16, comprising determining a terrain condition of the inclined surface; and selectively controlling the rate of automatically reducing the brake force dependent on the terrain condition.

18. The method of claim 11, comprising using a first rate of automatically reducing the brake force for a first determined drive torque condition; and using a second, different rate of automatically reducing the brake force for a second, different determined drive torque condition.

19. The method of claim 18, comprising achieving a first vehicle acceleration rate using the first rate of automatically reducing the brake force for a determined slope of the inclined surface;

achieving a second vehicle acceleration rate using the second rate of automatically reducing the brake force for the determined slope of the inclined surface; and wherein the first vehicle acceleration rate is approximately equal to the second vehicle acceleration rate.

20. The method of claim 11, comprising determining a target vehicle descent speed; and selectively controlling the rate of automatically reducing the brake force dependent on the target vehicle descent speed.

21. A vehicle comprising a system for controlling movement of the vehicle system including a brake assembly configured to selectively resist movement of a vehicle;

a controller that selectively controls a brake force applied by the brake assembly, the controller being configured to determine a drive torque condition when the vehicle is stationary on an inclined surface; and selectively control a rate of automatically reducing the brake force dependent on the determined drive torque condition to allow the vehicle to accelerate.

* * * * *

UNITED STATES PATENT AND TRADEMARK OFFICE
CERTIFICATE OF CORRECTION

PATENT NO. : 8,781,703 B2  
APPLICATION NO. : 13/627426  
DATED : July 15, 2014  
INVENTOR(S) : Owen et al.

Page 1 of 1

It is certified that error appears in the above-identified patent and that said Letters Patent is hereby corrected as shown below:

IN THE CLAIMS:

Claim 21, column 10, line 50; after "vehicle" insert --, the--

Signed and Sealed this  
Eleventh Day of November, 2014

Michelle K. Lee  
*Deputy Director of the United States Patent and Trademark Office*